United States Patent [19]

Tsutsumi

[11] Patent Number: 4,838,078
[45] Date of Patent: Jun. 13, 1989

[54] SUCTION AIR AMOUNT MEASURING DEVICE FOR AN ENGINE

[75] Inventor: Kazumichi Tsutsumi, Himeji, Japan

[73] Assignee: Mitsubishi Denki Kabushiki Kaisha, Tokyo, Japan

[21] Appl. No.: 188,392

[22] PCT Filed: Jul. 15, 1987

[86] PCT No.: PCT/JP87/00516
§ 371 Date: Dec. 18, 1987
§ 102(e) Date: Dec. 18, 1987

[87] PCT Pub. No.: WO88/00686
PCT Pub. Date: Jan. 28, 1988

[30] Foreign Application Priority Data

Jul. 17, 1986 [JP] Japan ............... 61-168413
Jul. 17, 1986 [JP] Japan ............... 61-168414

[51] Int. Cl.$^4$ ........................... G01M 15/00
[52] U.S. Cl. ..................... 73/118.2; 73/861.22
[58] Field of Search ........... 73/118.2, 861.22, 861.27; 123/494

[56] References Cited

U.S. PATENT DOCUMENTS 4,334,426  6/1982  Kita et al. ............... 73/118.2

FOREIGN PATENT DOCUMENTS 54-41665   3/1979  Japan .
54-123973  9/1979  Japan .
55-78917   5/1980  Japan .
56154668  11/1988  Japan .

Primary Examiner—Jerry W. Myracle
Attorney, Agent, or Firm—Bernard, Rothwell & Brown

[57] ABSTRACT

The invention provides a suction air amount measuring device for an engine wherein an operating constant of a binary digitizing circuit which is adapted to binary digitize an output of a Karman's vortex street flow rate sensor to produce Karman's vortex street pulses is changeably set in response to operating states of the engine. The measuring device thus has an effect that it can always produce correct Karman's vortex street pulses.

Further, contents of a counter is latched at a timing of each of pulses produced by waveform shaping received waves phase modulated by Karman's vortex streets in order to phase demodulate the received waves to binary digitize the phase of the received waves. Accordingly, an effect can be attained that an inexpensive, small and lightweight flow rate measuring device wherein most parts of a signal processing means can be processed on the digital signal basis and can be formed into a digital IC can be provided.

4 Claims, 5 Drawing Sheets

SUCTION AIR AMOUNT MEASURING DEVICE FOR AN ENGINE

TECHNICAL FIELD

This invention relates to a suction air amount measuring device for an engine wherein a suction air amount is measured by a Karman's vortex street flow rate sensor, that is, a sensor which detects, with ultrasonic waves, a frequency of vortex streets generated downstream of a vortex street generating member located in a fluid to be measured which flows in a conduit in order to measure a flow rate of the fluid.

BACKGROUND OF THE INVENTION

Various proposals have been made to a method of measuring a flow rate of a fluid from a frequency of Karman's vortex streets generated downstream of a vortex street generating member located in a conduit and are disclosed, for example, in Japanese Utility Model Laid-Open No. 54-41665 and Japanese Utility Model Laid-Open No. 57-160625.

Japanese Utility Model Laid-Open No. 54-41665 discloses a method which makes use of the fact that ultrasonic signal waves transmitted across a duct are phase modulated by Karman's vortex streets generated in the fluid. Meanwhile, Japanese Utility Model Laid-Open No. 57-160625 makes use of the fact that the resistance of a thermistor located in a duct and heated with a constant current flow varies in response to Karman's vortex streets.

In both of the conventional methods, the output electric signal is in the form of an analog signal which varies in response to Karman's vortex streets. Thus, where either one of the conventional devices is used, for example, as a suction air amount sensor for fuel injection control of an engine, normally the output electric signal is converted into binary digitized Karman's vortex street pulses for its application. A conventional method of converting an analog signal into such pulses is disclosed, for example, in Japanese Patent Publication No. 58-70131.

By the way, when such a Karman's vortex street flow rate sensor is used as a suction air amount sensor for an engine, it will give rise to following problems as described in part in Japanese Patent Publication No. 58-70131.

In particular, when a throttle valve is positioned at a high opening position, pulsations of air caused by an air sucking action of the engine are transmitted to a suction air path so that the output level of the flow rate sensor is varied significantly in response to such pulsations.

To the contrary, when the throttle valve is positioned at a low opening position, so-called "wind whistles" are produced by suction air passing through the valve at a high speed and have an influence on the Karman's vortex street sensor in the suction air path so that the sensor develops an output in which high frequency noises are overlapped.

When such an output signal is compared with a predetermined voltage on a voltage comparator in order to binary digitize the same to produce Karman's vortex street pulses as disclosed, for example, in above-mentioned Japanese Patent Publication No. 58-70131, a so-called "falling off" of pulses will occur upon high opening of the throttle valve, and on the contrary upon low opening of the valve, the output will involve pulses originating from overlapped high frequency noises.

The present invention has been made to resolve such problems as described above, and it is an object of the present invention to provide a suction air amount measuring device for an engine which always outputs correct pulses of Karman's vortex street irrespective of an operating condition of the engine.

By the way, as digital circuit techniques have been developed in recent years, associated devices such as, for example, microprocessors, gate arrays and memories have been remarkably reduced in price and improved in function.

In view of such circumstances as described above, it is desired for a Karman's vortex street flow rate measuring instrument to be reduced in price, improved in function and reduced in size and weight by constituting signal processing circuitry thereof from digital circuits.

However, the conventional techniques or means described above cannot suitably be formed from digital circuits. For example, if it is intended to form from a digital circuit a phase shifting circuit of the conventional technique which makes a principal part of a signal processing circuit, it gives rise to a problem that a register for a very large number of bits is required.

The present invention has been made to also resolve such a problem as described just above, and it is another object of the present invention to provide a suction air amount measuring device wherein a signal processing system is employed which can be suitably formed from a digital circuit.

DISCLOSURE OF THE INVENTION

A suction air amount measuring device for an engine according to the present invention comprises a binary digitizing circuit for binary digitizing a continuously varying signal outputted from a Karman's vortex street flow rate sensor, and means for changeably setting an operating constant of the binary digitizing circuit in response to an operating parameter of the engine such as a throttle opening of the engine.

According to the present invention, the operating constant of the binary digitizing circuit is changeably set in response to an operating parameter of an engine, and the binary digitizing circuit binary digitizes, depending upon the operating constant, a continuously varying signal outputted from a Karman's vortex street flow rate sensor. Accordingly, normally correct Karman's vortex street pulses are produced.

Further, since contents of a counter are latched at timings of pulses produced by waveform shaping received waves which are phase modulated by Karman's vortex streets in order to phase demodulate the received waves and then the phase is binary digitized, most part of a signal processing means can be processed at a digital signal level. Accordingly, an effect can be attained that a suction air amount measuring device is obtained which can be formed readily from a digital IC and is inexpensive, small in size and light in weight.

BEST MODE OF CARRYING OUT THE INVENTION

Figure 1:
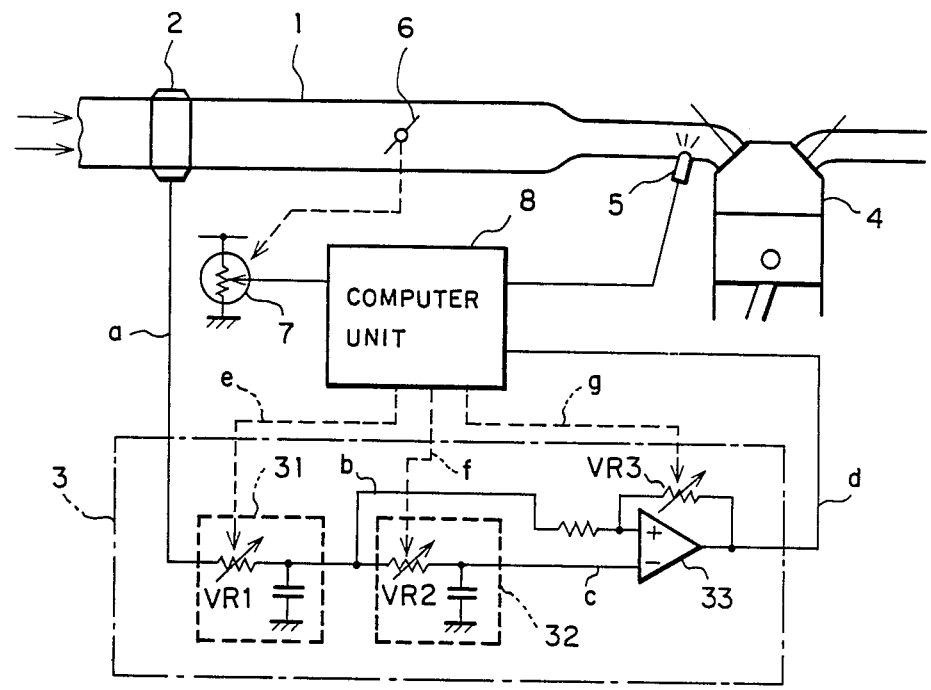
FIG. 1 is a block diagram showing an embodiment of suction air amount measuring device for an engine of the present invention.

Now, an embodiment of suction air amount measuring device for an engine of the present invention will be described with reference to the drawings. FIG. 1 illustrates an embodiment of the present invention and is a block diagram showing an example wherein the suction air amount measuring device is used for fuel injection control.

Referring to FIG. 1, reference numeral 1 denotes a suction air path of an engine, and 2 a Karman's vortex street flow rate sensor located in the suction air path 1. An output a of the Karman's vortex street flow rate sensor 2 is binary digitized on a binary digitizing circuit 3 to produce a Karman's vortex street pulse d.

The binary digitizing circuit 3 includes a first low-pass filter 31 for removing high frequency noise components from the output a of the Karman's vortex street flow rate sensor 2, a second low-pass filter 32 for averaging an output b of the first low-pass filter 31, and a comparator 33 having a hysteresis characteristic for comparing the outputs b, c of the first and second low-pass filters 31, 32 in magnitude with each other. Time constants of the first and second low-pass filters 31, 32 and a hysteresis width of the comparator 33 are changeably set from a computer unit 8.

A throttle valve 6 is located in the suction air path 1, and the opening of the throttle valve 6 is detected by an opening sensor 7. An output of the opening sensor 7 is forwarded to the computer unit 8.

The Karman's vortex street pulse d mentioned above is also delivered to the computer unit 8. A fuel chamber is controlled via an injection valve 5 in response to the Karman's vortex street pulse d, an output of the opening sensor 7, a rotational frequency of the engine and so on. The injection valve 5 is located near a cylinder 4 of the engine.

The computer unit 8 is further connected to change a variable resistor VR1 of the first low-pass filter 31, another variable resistor VR2 of the second low-pass filter 32, and a further variable resistor VR3 connected across one of the input terminals and the output terminal of the comparator 33 in order that it may changeably set an operating constant of the binary digitizing circuit 3 in response to a condition or a parameter of the engine.

Figure 2:
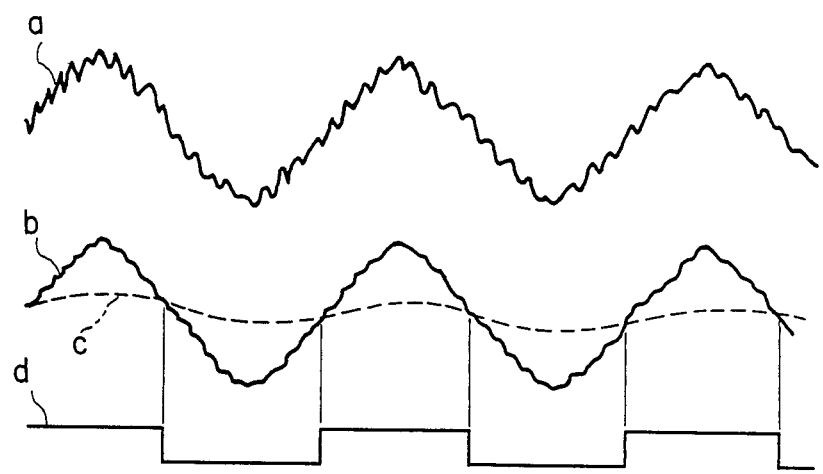
FIGS. 2 and 3 are timing charts showing signals at various portions of the suction air amount measuring device for an engine of FIG. 1.
Figure 3:
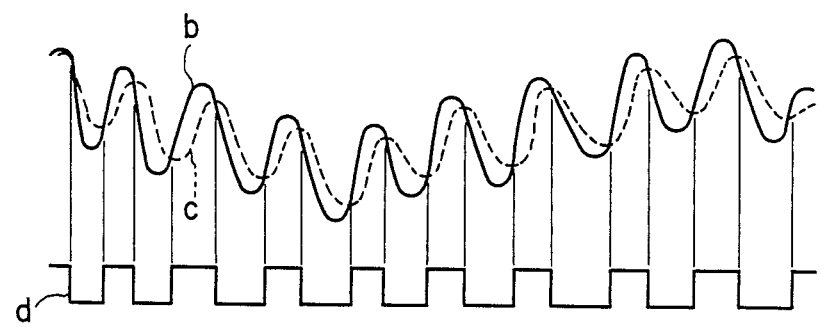

Now, operation will be described. FIGS. 2 and 3 are timing charts showing signals at several portions of the binary digitizing circuit 3, and FIG. 2 shows signals when the throttle valve 6 is positioned at its low opening position and high frequency noises are overlapped in the output a of the Karman's vortex street flow rate sensor 2 as described hereinabove while FIG. 3 shows signals when the throttle valve 6 is positioned at its high opening position and the output a of the Karman's vortex street flow rate sensor 2 is caused to fluctuate significantly in level by an influence of pulsations described above.

Referring to FIG. 1, a signal a outputted from the Karman's vortex street flow rate sensor 2 is delivered to the first low-pass filter 31 at which high frequency noise components are removed therefrom and is then averaged by the second low-pass filter 32.

Accordingly, by comparing outputs b, c of the first low-pass filter 31 and the second low-pass filter 32 in magnitude with each other on the comparator 33, the output signal a of the Karman's vortex street flow rate sensor 2 is binary digitized to obtain a Karman's vortex street pulse d.

The computer unit 8 thus receives the Karman's vortex street pulse d, calculate a suction air amount for the engine from the Karman's vortex street pulse d, and determines a fuel injection amount in accordance with a result of such comparison.

When the throttle valve 6 is positioned at its low opening position, the computer unit 8 detects this by way of the opening sensor 7 and delivers setting signals (e, f, g in FIG. 1) to the binary digitizing circuit 3 so that the time constants of the first and second low-pass filters 31, 32 may be increased and the hysteresis width of the comparator 33 may be also increased.

With such setting, high frequency noises (The a of FIG. 2) which may appear upon low throttle opening are remarkably reduced in level by the first low-pass filter 31 as shown by waveforms b, c of FIG. 2. Then, after passing the comparator 33 with the hysteresis width thereof set wide, the Karman's vortex street pulse d is completely clear of an influence of the high frequency noises.

To the contrary, when the throttle valve 6 is positioned at its high opening position, the computer unit 8 delivers setting signals e, f, g to the binary digitizing circuit 3 so that the time constants of the first and second low-pass filters 31, 32 may be decreased and the hysteresis width of the comparator may also be decreased.

With such setting, the output c of the second low-pass filter 32 for averaging varies sufficiently following fluctuations in level of the input b of the second low-pass filter 32 caused by pulsations described above as shown by waveforms b, c of FIG. 3.

In this instance, as the time constant of the second low-pass filter 32 is decreased in order to improve the following performance, the difference between the two signals b, c inputted to the comparator 33 is decreased. However, since the hysteresis width of the comparator 33 is also set to a small width correspondingly, proper binary digitization can be attained.

By the way, while in the embodiment shown in FIG. 1 the binary digitizing circuit 3 is shown as an analog circuit in order to facilitate description, a similar function can be attained if the binary digitizing circuit 3 is formed otherwise as a digital circuit. In particular, the binary digitizing circuit 3 can be attained readily if the first and second low-pass filters 31, 32 are each formed from a low-pass digital filter and the comparator 33 is formed from a magnitude comparator. Further, if the binary digitizing circuit 3 is formed from digital circuits, setting of the filter time constants and setting of the comparator hysteresis width by the computer unit 8 which is in most cases constituted from a microprocessor can be effected readily.

Now, an embodiment wherein a binary digitizing circuit is formed from digital circuits will be described in detail.

Figure 4:
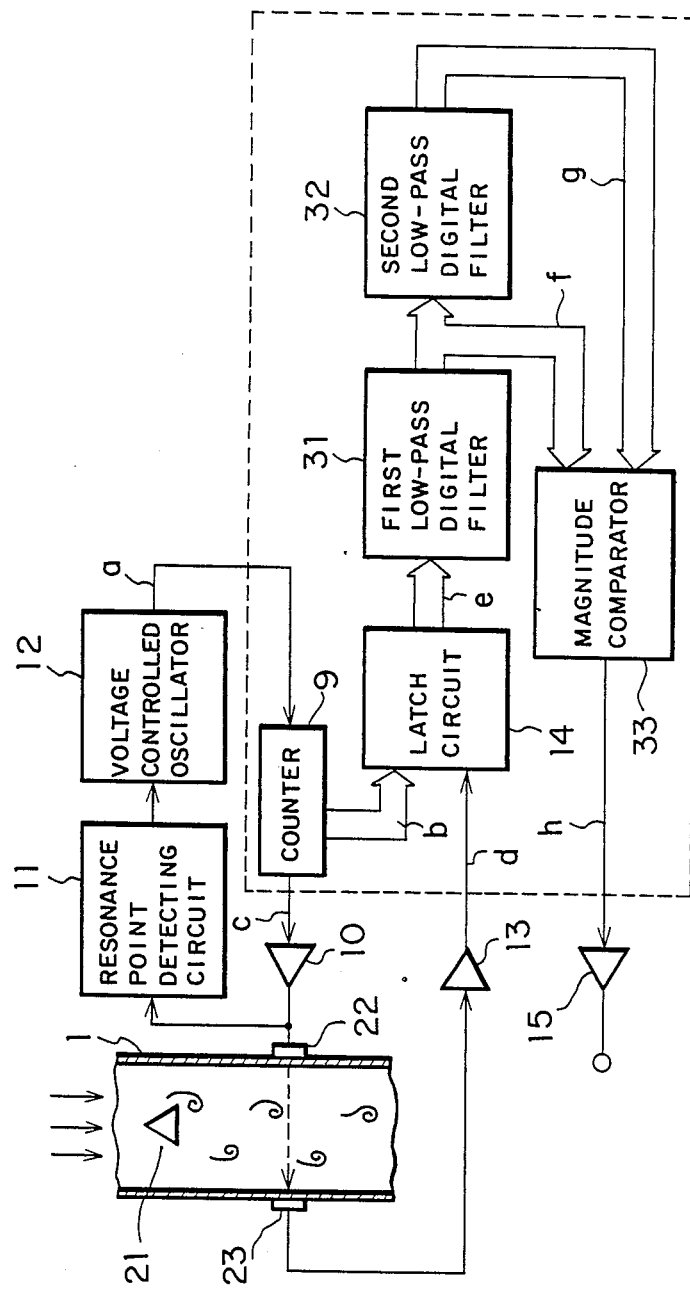
FIG. 4 is a block diagram showing an embodiment of flow rate measuring device of the present invention.

FIG. 4 is a block diagram showing the embodiment. Referring to FIG. 4, reference numeral 1 denotes a suction air path which is a duct of a fluid to be measured. A vortex generating member 21 is located in the duct 1, and an ultrasonic wave generating vibrator 22 and an ultrasonic wave receiving vibrator 23 are located in an opposing relationship across the duct 1 downstream of the vortex street generating member 21.

The ultrasonic wave generating vibrator 22 is excited via a driving circuit 10 by an output of a counter 9, and a resonance point detecting circuit 11 detects whether or not the ultrasonic wave generating vibrator 22 is excited at its resonance point.

A voltage controlled oscillator 12 is controlled in response to an output of the resonance point detecting circuit 11, and an output of the voltage controlled oscillator 12 is counted and thus divided by the counter 9.

The driving circuit 10 is driven by pulses obtained by division on the counter 9.

Meanwhile, an output of the ultrasonic wave receiving vibrator 23 is delivered to a waveform shaping circuit 13 which thus produces waveform shaped pulses. At a timing of the rising edge of each of the pulses, a latch circuit 14 fetches a count value of the counter 9 and latches it therein.

An output of the latch circuit 14 is delivered to a first low-pass digital filter 31. The first low-pass digital filter 31 is provided to remove high frequency noise components from the output of the latch circuit 14, and an output of the first low-pass digital filter 31 is forwarded to a second low-pass digital filter 32. The second low-pass digital filter 32 is provided to average the output of the first low-pass digital filter 31.

The outputs of the first and second low-pass digital filters 31, 32 are compared in magnitude with each other on a magnitude comparator 33, and an output of the magnitude comparator 33 is forwarded to a buffer 15.

Figure 5:
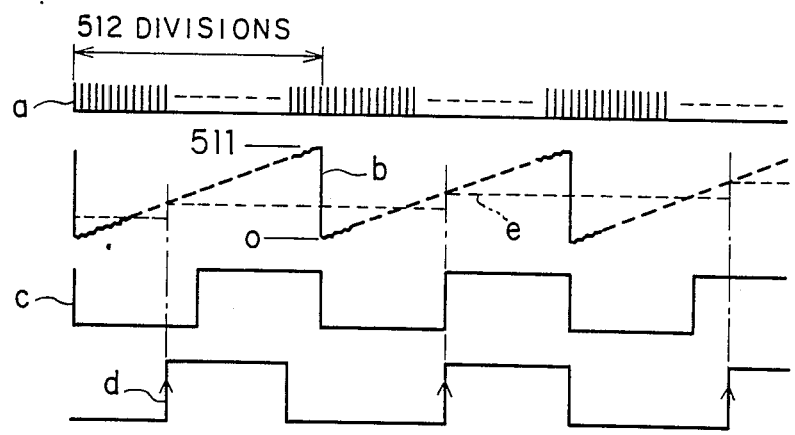
FIGS. 5 to 8 are timing charts showing signals at various portions of the flow rate measuring device of FIG. 4.
Figure 6:
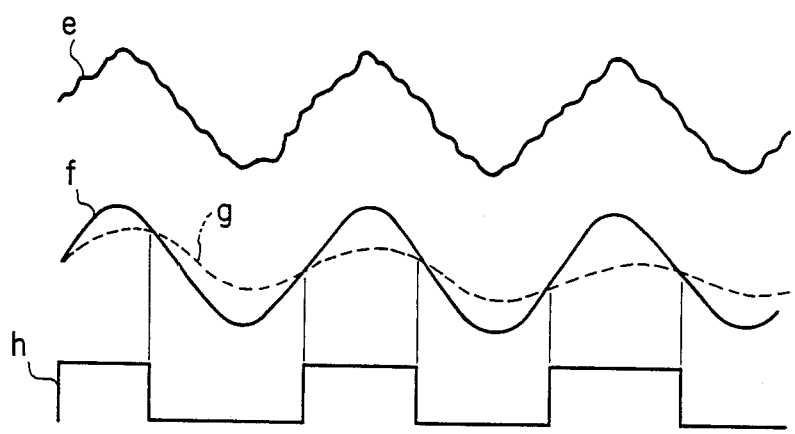

Now, operation will be described. FIGS. 5 and 6 are timing charts showing signals at several portions of FIG. 4, and FIG. 5 illustrates a manner of counting of pulses by the counter 9 and a manner of phase demodulation by the latch circuit 14 while FIG. 6 illustrates a manner of binary digitization of a phase e demodulated by the magnitude comparator 33.

It is to be noted that a relation between FIGS. 5 and 6 is such that a demodulated signal e in FIG. 5 is a microscopic representation of a phase demodulated signal e in FIG. 6.

Referring to FIG. 4, the voltage controlled oscillator 12 is oscillating at, for example, about 20 MHz, and the frequency is controlled by the resonance point detecting circuit 11 such that the ultrasonic wave generating vibrator 22 may be excited at the resonance point thereof.

Output pulses (a of FIG. 5) of the voltage controlled oscillator 12 is counted in a recurring manner as shown by b in FIG. 5 by the counter 9 which is formed, for example, as a binary up counter for 9 bits.

Now, if the most significant bit is considered, it presents pulses which are obtained by dividing the output pulses a of the voltage controlled oscillator 12 by 512, that is, pulses of about 40 MHz (c of FIG. 5).

The ultrasonic wave generating vibrator 22 is excited via the driving circuit 10 by the pulses c. Ultrasonic waves generated by the ultrasonic wave generating vibrator 22 are first phase modulated by Karman's vortex streets within the duct 1 and then transmitted to the ultrasonic wave receiving vibrator 23. Then, an output of the ultrasonic wave receiving vibrator 23 is shaped by the waveform shaping circuit 13 in order to produce phase modulated pulses (d of FIG. 5).

Then, contents of the counter 9 are taken into the latch circuit 14 at a timing of the rising edge of each of the pulses d. Thus, the output of the latch circuit 14 (e of FIG. 5) make a phase demodulated signal.

In other words, since the counter 9 operates as a divider and also as a phase counter which divides a phase of one cycle of the transmitted wave c by 512 and counts them, if counter contents are taken in at a timing of the received wave d, then the output of the counter makes itself a phase demodulated signal e.

Thereafter, the phase demodulated signal e is delivered to the first low-pass digital filter 31 in which noise components are removed from the phase modulated signal e (f of FIG. 5).

In short, since not only Karman's vortex streets described above but also, for example, sound sources outside the duct and so on act to modulate the phase of ultrasonic waves and make noises in a demodulated signal, such noises must be removed by means of a filter.

A demodulated signal f from which noises have been removed in this manner is subsequently averaged by the second low-pass digital filter 32 (g of FIG. 6).

Then, the two signals f, g obtained in such a manner as described above are compared in magnitude with each other by the magnitude comparator 33 in order to produce a binary digitized pulse signal h. The frequency of the pulses h corresponds to the frequency of the Karman's vortex streets.

It is to be noted that all elements within a block of the processing circuit described above which is shown in broken lines in FIG. 4 process signals in the form of digital signals and accordingly can be readily formed into a digital IC at a low cost by a technique of, for example, gate arrays.

Figure 7:
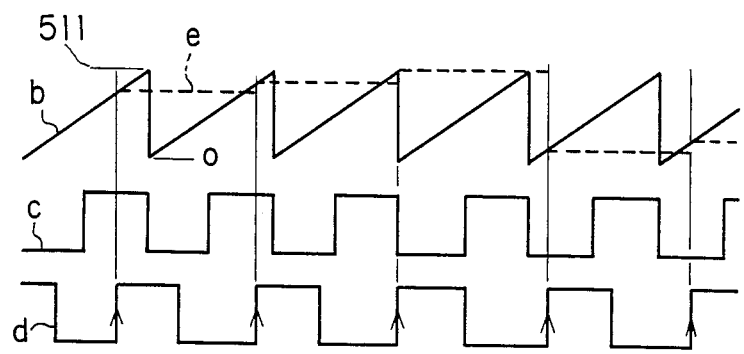

By the way, since the embodiments of the present invention described above do not involve such fixation of an average value of the phase difference between the transmitting and receiving sides by a phase shifting circuit that is involved in a conventional technique, the phases of transmitted and received waves may sometimes have such a relation, for example, as seen in FIG. 7.

In particular, in FIG. 7, such phase modulation is effected that timings of the rising edges of received pulses d are fluctuated before and after the count value b changes from the maximum count value 511 to the minimum count value 0.

Figure 8:
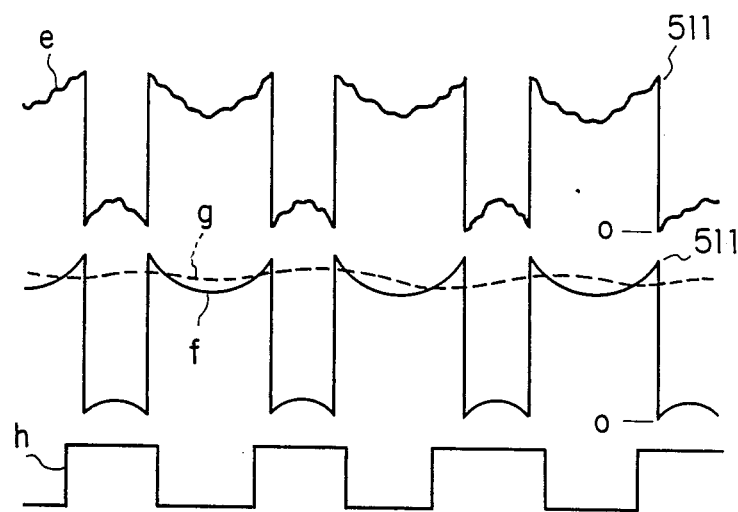

In this instance, the phase demodulated signal e presents a jump from the maximum value 511 of the counter to the minimum value 1 as seen in FIG. 8. However, counting of the counter is effected in a recurring manner when comparison in magnitude is made on the magnitude comparator 33. Thus, if it is determined that the maximum value 511 and the minimum value 0 are contiguous to each other, binary digitization can be effected in a similar manner to the case of FIG. 6 as shown by waveform curves f, g, h of FIG. 8.

Such determination can be readily made in digital processing. In other words, the embodiments of the present invention do not require a phase shifting circuit which is a principal part of a conventional processing circuit.

What is claimed is:

1. A suction air amount measuring device for an engine, characterized in that said device comprises a Karman's vortex street flow rate sensor located in a suction air path of said engine, a binary digitizing circuit for binary digitizing an output of said Karman's vortex street flow rate sensor to produce Karman's vortex street pulses, and means for changeably setting an operating constant of said binary digitizing circuit in response to operating states of said engine at least including a throttle opening.

2. A suction air amount measuring device for an engine according to claim 1, characterized in that said binary digitizing circuit includes a first low-pass filter for removing high frequency noise components from the output of said Karman's vortex street flow rate sensor, a second low-pass filter for averaging an output of said first low-pass filter, and a comparator for comparing the output of said first low-pass filter and an output of said second low-pass filter in magnitude with each other.

3. A suction air amount measuring device for an engine according to claim 2, characterized in that said first low-pass filter and said second low-pass filter are each constituted from a low-pass digital filter while said comparator is constituted from a magnitude comparator.

4. A suction air amount measuring device for an engine, characterized in that said device comprises an ultrasonic wave generating vibrator and an ultrasonic wave receiving vibrator located in an opposing relationship across a suction air path of said engine downstream of a vortex street generating member inserted in a fluid to be measured within said suction path, a resonance point detecting circuit for detecting whether or not said ultrasonic wave generating vibrator is excited at the resonance point thereof, a voltage controlled oscillator connected to be controlled by said resonance point detecting circuit, a counter for dividing output pulses of said voltage controlled oscillator by counting the pulses, a driving circuit for exciting said ultrasonic wave generating vibrator with the pulses divided by said counter, a latch circuit for fetching contents of said counter at a timing of each of pulses produced by waveform shaping an output of said ultrasonic wave receiving vibrator, and binary digitizing means for determining increase or decrease of an output of said latch circuit.

* * * * *